United States Patent [19]
Yoshida et al.

[11] Patent Number: 5,764,610
[45] Date of Patent: Jun. 9, 1998

[54] OPTICAL DISK TYPE IDENTIFICATION SYSTEM USING A FREQUENCY DETECTOR

[75] Inventors: Masayoshi Yoshida; Naoharu Yanagawa, both of Tokorozawa, Japan

[73] Assignee: Pioneer Electronic Corporation, Tokyo, Japan

[21] Appl. No.: 784,383

[22] Filed: Jan. 17, 1997

[30] Foreign Application Priority Data

Jan. 18, 1996 [JP] Japan .................. 8-024564

[51] Int. Cl.$^6$ ........................ G11B 3/90
[52] U.S. Cl. ........................ 369/58; 369/50
[58] Field of Search ............... 369/58, 54, 32, 369/124, 50, 239, 190

[56] References Cited

U.S. PATENT DOCUMENTS 5,508,987 4/1996 Matsunaga et al. .................. 369/58
5,644,561 7/1997 Son et al. .................. 369/58

*Primary Examiner*—Tan Dinh
*Attorney, Agent, or Firm*—Morgan, Lewis & Bockius LLP

[57] ABSTRACT

A disc type identifying system for efficiently identifying one optical disc type from others having different recording formats, though having the same size and shape, is provided. The disc type identifying system comprises driver for rotating a disc to be identified a predetermined number of rotations; frequency detector for detecting frequency of a playback signal from the disc to be identified; and identifier for identifying the disc type based on the frequency of the playback signal detected when the disc to be identified is rotated the predetermined number of rotations. The predetermined number of rotations is set at the lowest linear speed among linear speeds defined in the different recording formats. Because the disc type may be identified in the process of a startup operation of a combination unit by constructing as described above, the startup time may be shortened, thus enhancing the efficiency of the system.

12 Claims, 9 Drawing Sheets

5,764,610

OPTICAL DISK TYPE IDENTIFICATION SYSTEM USING A FREQUENCY DETECTOR

BACKGROUND OF THE INVENTION

This application claims the benefit of Application No. 8-24564, filed in Japan on Jan. 18, 1996, which is hereby incorporated by reference.

1. Field of the Invention

The present invention relates to a disc type identifying system of optical discs and more particularly to a disc type identifying system for identifying the disc type based on the read signals obtained in rotating a plurality of different types of read-only discs and a plurality of different types of rewritable discs at a predetermined number of rotations.

2. Description of Related Art

Hitherto, there has been an identifying system for identifying the type of an optical disc such as one shown in FIG. 10. The system shown in FIG. 10 distinguishes a CD (compact disc) which is a read-only disc type from a CD-R (write-once compact disc) which is a rewritable disc. In the figure, the disc 1 (hereinafter reference to the disc 1 means the target disc i.e. the disc type which is to be identified) is identified by the system comprising a light pickup 2, a spindle motor 3 for rotating the disc to be identified, a head amplifier circuit 4, a servo circuit 5, a rotation control circuit 6 for controlling rotational speed of the spindle motor 3, a recorded pit detecting circuit 7 and a system control circuit 8.

The disc 1 is rotated by the spindle motor 3 which performs the rotational operation in response to a control signal from the rotation control circuit 6. Corresponding to a rotation command from the system control circuit 8, the rotation control circuit 6 compares a pulse signal (FG) generated from a pulse encoder (not shown) attached to a rotary shaft of the spindle motor 3 and having a frequency proportional to the rotational speed of the motor with a pulse signal indicating the rotational speed preset in the FG setting section 81. Setting section 81 which is within the system control circuit 8, generates the control signal for zeroing the difference of the frequencies and forwards it to the spindle motor 3. A servo loop for controlling the rotation of the spindle is thus formed and the disc 1 is rotated at the rotational speed preset by the system control circuit 8.

The light beam is emitted from the light pickup 2 is reflected onto the recorded surface of the disc 1 is received by light receiving means (not shown) of the light pickup 2 as reflected diffracted light carrying information of the recorded surface. The received reflected diffracted light is converted into an electrical signal to be outputted to the head amplifier circuit 4. The head amplifier circuit 4 implements predetermined operational processing on the input electrical signal to generate error signals, such as a focus error signal and a tracking error signal, and an RF signal. The signals are then amplified to a desirable amplitude level and outputted to the servo circuit 5 and the recorded pit detecting circuit 7. In accordance with the instruction from the system control circuit 8, the servo circuit 5 generates control signals for conducting focus, tracking, and slider control based on the input error signals and supplies them to a slider motor for shifting the objective lens (not shown) and the light pickup 2 in the radial direction of the disc. The recorded pit detecting circuit 7 samples an envelope of the input RF signal to determine whether the amplitude level of the envelope is greater than a predetermined level or not. When it is greater than the predetermined level, indicating that pits are formed on the disc 1, it generates a pit detection signal and forwards it to the system control circuit 8.

At first, the system control circuit 8 drives the slider motor via the servo circuit 5 in order to shift the light pickup 2 to the position corresponding to an area containing the Table Of Contents (TOC) of the CD. Next, it outputs a rotation command signal to the rotation control circuit 6 in order to rotate the disc 1 at a predetermined number of rotations. It then causes the light pickup 2 to emit a light beam and to conduct the focus control so that the beam converges onto the recorded surface of the disc. Next, it determines whether the pit detection signal is outputted from the recorded pit detecting circuit 7 and judges the disc type as a CD (including a CD-R to which the final process has been implemented) when the signal is outputted or as a CD-R in which an unrecorded portion exists when the signal is not output. Thus, the system identifies whether the disc type is a read-only optical disc or a rewritable optical disc utilizing the fact that pits carrying TOC information are always recorded in the TOC area in the read-only type optical disc including the CD-R to which the final process has been implemented and that no TOC information is recorded in the TOC area until contents to be recorded is defined in a non-recorded disc.

It is noted that a synchronization signal and address information for retrieving positions (hereinafter such information is referred to as pre-information) are recorded in re-writable optical discs such as the CD-R in advance in a pre-formatting process carried out in manufacturing the disc. Such pre-information is recorded on recording tracks in the shape of pits (hereinafter referred to as pre-pits) which have been recorded and modulated in a predetermined manner or recorded by a method called wobbling for recording a read beam by meandering a guide groove for guiding the read beam to the recording track by an FM modulated signal (hereinafter referred to as a wobble signal) in which the pre-information is carried as a modulated signal on a carrier of 22.05 KHz for example.

However, the development of a Digital Versatile Disc (DVD) whose capacity for recording information has been substantially increased, as compared to the CD, has been actively conducted lately. The DVD is a high density recording medium which can record one whole movie or the like even though its size and shape are almost the same as those of the CD. Furthermore, the DVD-R was developed to function as a rewritable optical disc which can record a movie, music or the like, whichever its user selects, utilizing the same recording format as the DVD. Accordingly, it is more convenient to be able to record/play back from four different kinds of optical discs, such as the CD, CD-R, DVD and DVD-R, utilizing only one recording/playback unit (hereinafter such a recording/playback unit will be referred to as a combination unit). Thus, because specifications or standards of each of the disc format types are different from each other, it is necessary to distinguish between the types of the discs and to switch to the applicable characteristic circuit conforming to the disc type in the combination unit. Although, it has been possible to distinguish between discs among the read-only disc type and the rewritable disc type having the same recording format, such as the CD and the CD-R or the DVD and the DVD-R by the conventional discrimination method, it has been impossible to distinguish between discs with different recording formats such as the CD and the DVD.

Accordingly, it is an object of the present invention to provide a disc type identifying system which can efficiently distinguish between at least four types of optical discs, having different recording formats such as the CD, CD-R, DVD and DVD-R.

SUMMARY OF THE INVENTION

In order to solve the aforementioned problem, according to one aspect of the present invention described in claim 1, a disc type identifying system for efficiently distinguishing one optical disc type from other disc types having different recording formats, though having the same size and shape, comprises driving means for rotating a disc types to be identified, a predetermined number of rotations; frequency detecting means for detecting frequency of a playback signal from the disc to be identified; and identifying means for distinguishing the disc type based on the frequency of the playback signal detected when the disc is rotated the predetermined number of rotations.

According to the operation of the invention, the driving means rotates the disc the predetermined number of rotations. The frequency detecting means detects the frequency of the playback signal from the disc which is being rotated; and the identifying means identifies the disc type based on the relationship between the predetermined number of rotations and the frequency of the playback signal.

According to another aspect of the present invention, the predetermined number of rotations in the invention described in Claim 1 is set at the lowest linear speed among the linear speeds utilized by the different recording formats.

According to the operation of the present invention, the driving means rotates the disc so that the predetermined number of rotations is set at the lowest linear speed among the linear speeds utilized by the different recording formats, in addition to the operation of the invention described in Claim 1.

The specific nature of the invention, as well as other objects, uses and advantages thereof, will be clearly revealed from the description of the preferred embodiments and from the accompanying drawings.

It is to be understood that both the foregoing general description and the following detailed description are exemplary and explanatory and are intended to provide further explanation of the invention as claimed.

DESCRIPTION OF PREFERRED EMBODIMENTS

Preferred embodiments of the present invention will be explained below with reference to the drawings.

[First Embodiment]

A first embodiment of the present invention will be explained with reference to FIGS. 1 through 4. In the first embodiment, it is assumed that pre-information of the DVD-R is in the form of a wobble signal and it is preformatted such that the frequency of the wobble signal is approximately 22.05 KHz when the DVD-R is rotated at a linear speed of 3.27 m/sec. (about 2.5 times of that of a CD-R's linear speed of 1.3 m/sec.).

Figure 10:
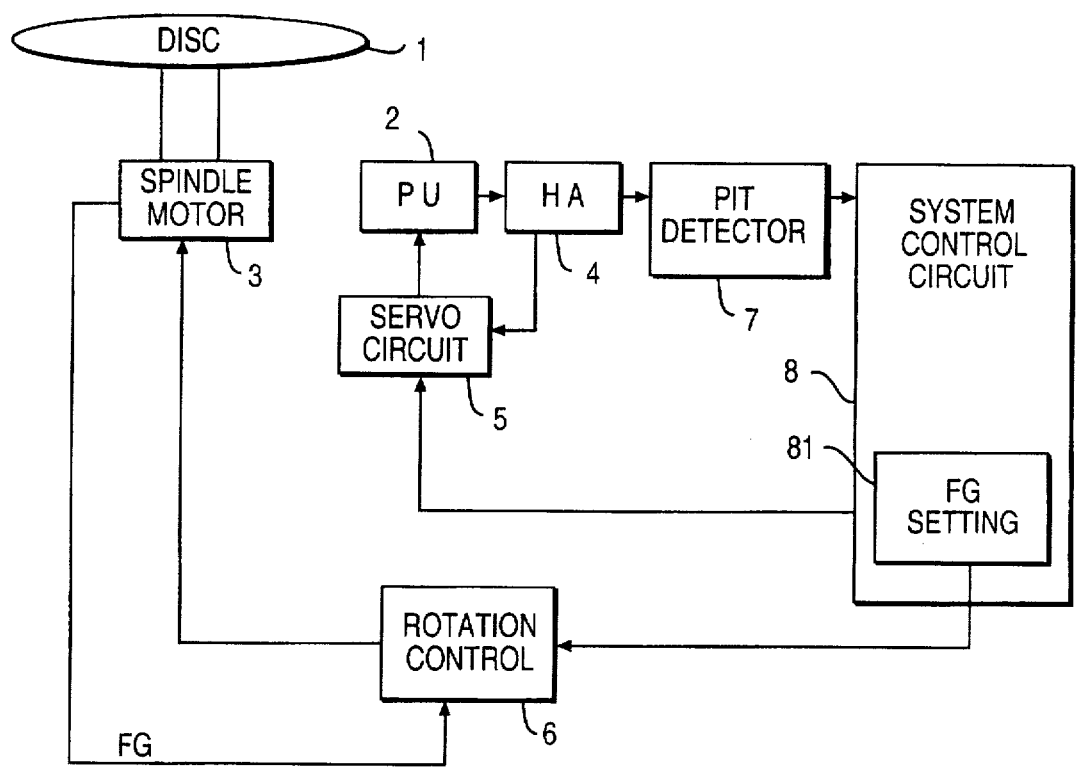
FIG. 10 is a block diagram depicting a circuit configuration of the prior art disc type identifying system.

The structure of the disc type identifying system of the first embodiment will be explained with reference to FIG. 1. It is noted that corresponding components, also depicted in FIG. 10, are designated by the same reference numerals and an explanation thereof will be omitted here.

Figure 1:
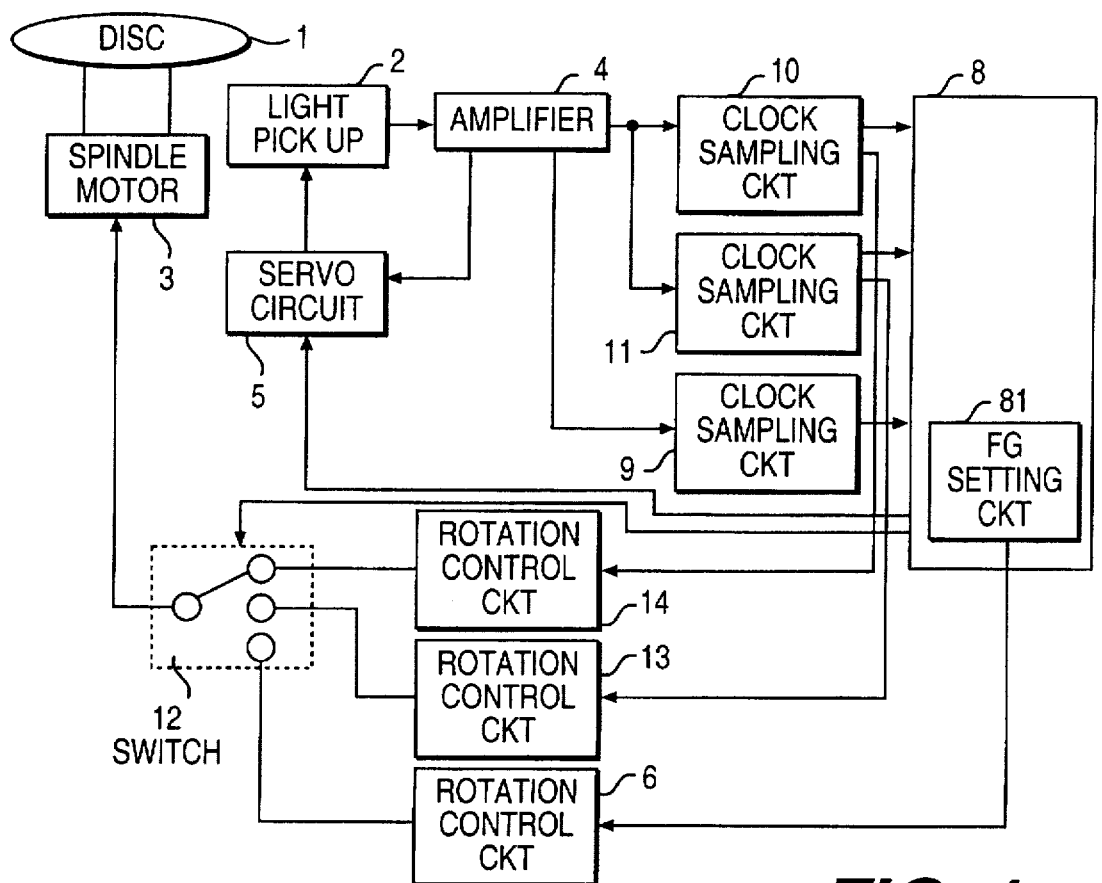
FIG. 1 is a block diagram depicting the circuit configuration of the first embodiment of the present invention.

In FIG. 1, an RF signal, among other signals is read from the disc 1, and the output from the head amplifier circuit 4 is forwarded to the clock sampling circuits 10 and 11. A push-pull error signal is forwarded to the wobble signal detecting circuit 9.

Figure 2:
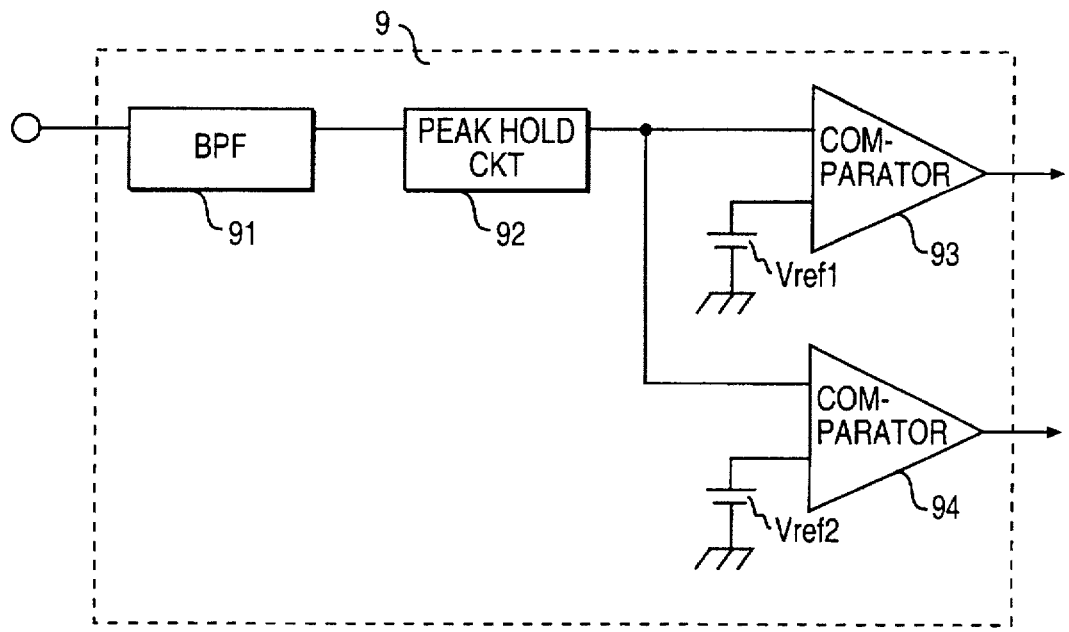
FIG. 2 is a block diagram depicting the circuit configuration of the wobble signal detecting circuit of the first embodiment of the present invention.

The wobble signal detecting circuit 9 samples the wobble signal recorded as a modulated signal carrying the pre-information in the rewritable disc type and comprises, as shown in FIG. 2, a BPF circuit 91 having a center frequency of 22.05 KHz for example, a Peak Hold (P/H) circuit 92 for converting an absolute value of an output signal from the BPF circuit 91 to hold its peak value, a comparator circuit 93 for comparing an output from the P/H circuit 92 with a reference value $V_{ref1}$ and a comparator circuit 94 for comparing the output from the P/H circuit 92 with a reference value $V_{ref2}$.

Here, the reference value $V_{ref1}$ is preset to a value smaller than a minimum value of the peak level obtained via the BPF circuit 91 and the P/H circuit 92 when the wobble signal is recorded onto the disc 1. Because the frequency of the wobble signal is pre-formatted to be approximately 22.05 KHz when both the CD-R and DVD-R discs are rotated at the predetermined linear speed defined for each disc. When the disc 1, is rotated at the linear speed of the CD-R disc type (about 1.3 m/sec) even though the disc 1 is of the DVD-R type, it ends up being rotated at the linear of 1.3 m/sec which is approximately 2.5 times slower than the predetermined linear speed of the DVD-R disc types of 3.27 m/sec, causing the frequency of the wobble signal to be approximately 8.8 KHz. That is, while the amplitude level of the frequency signal biased from 22.05 KHz is attenuated by the BPF circuit 91 having a center frequency of 22.05 KHz, an H-level signal indicating that the wobble lo signal exists on the disc is outputted from the comparator circuit 93 if the reference value $V_{ref1}$ is set at a value smaller than the peak value of the amplitude value attenuated by the BPF. It is noted that because the comparator circuit 93 carries out the operation for detecting the wobble signal, the reference value $V_{ref1}$ is set at a value greater than zero level.

Meanwhile, the reference value $V_{ref2}$ is utilized to confirm that the frequency of the detected wobble signal is 22.05 KHz. The value is selected such that it is greater than the peak value of the output level from the BPF circuit 91 to the wobble signal of about 8.8 KHz which is obtained when the disc 1, (as previously stated, hereinafter reference to the disc or the disc 1 means the target disc i.e. The disc which is to be identified) is the DVD-R type disc and it is rotated at the linear speed of the CD-R type as described above, for example. By setting the reference value $V_{ref2}$ as described above, an H-level signal is outputted from the comparator circuit 94 when the wobble signal of 22.05 KHz is inputted and an L-level signal is outputted when the wobble signal of 8.8 KHz is inputted.

By selecting the reference values $V_{ref1}$ and $V_{ref2}$ as described above, while the output signals from the comparator circuits 93 and 94 are both H-level signals when the disc 1, is rotated at the linear speed of the CD-R disc type and the disc is the CD-R type, an H-level signal is outputted from the comparator circuit 93 and the L-level signal is of outputted from the comparator circuit 94 when the disc 1, is the DVD-R type. Therefore, it becomes possible to distinguish one disc type from another by the patterns of the output signal levels from those respective comparator circuits 93 and 94.

Figure 3A:
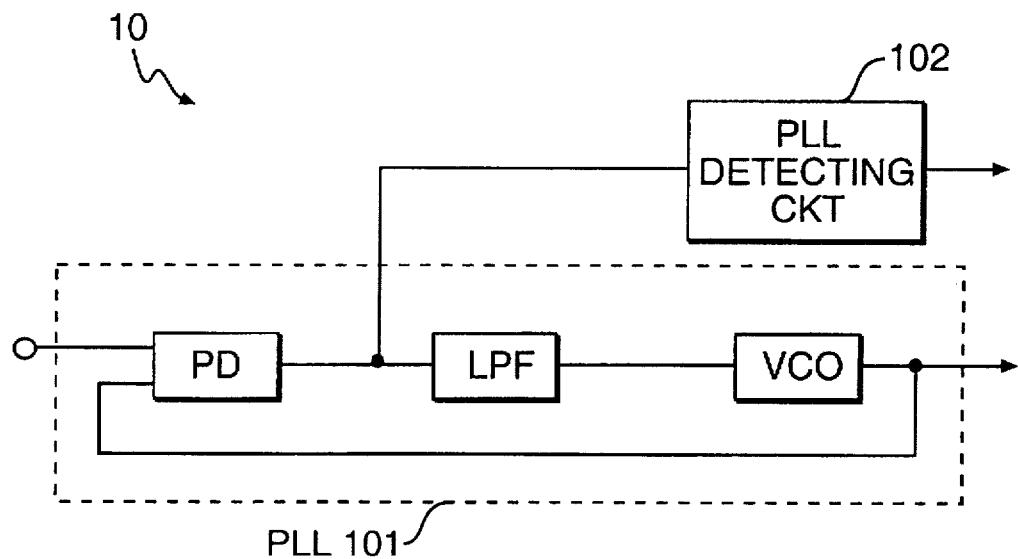
FIGS. 3a and 3b are block diagrams depicting a circuit configuration of the clock sampling circuit of the first embodiment of the present invention.
Figure 3B:
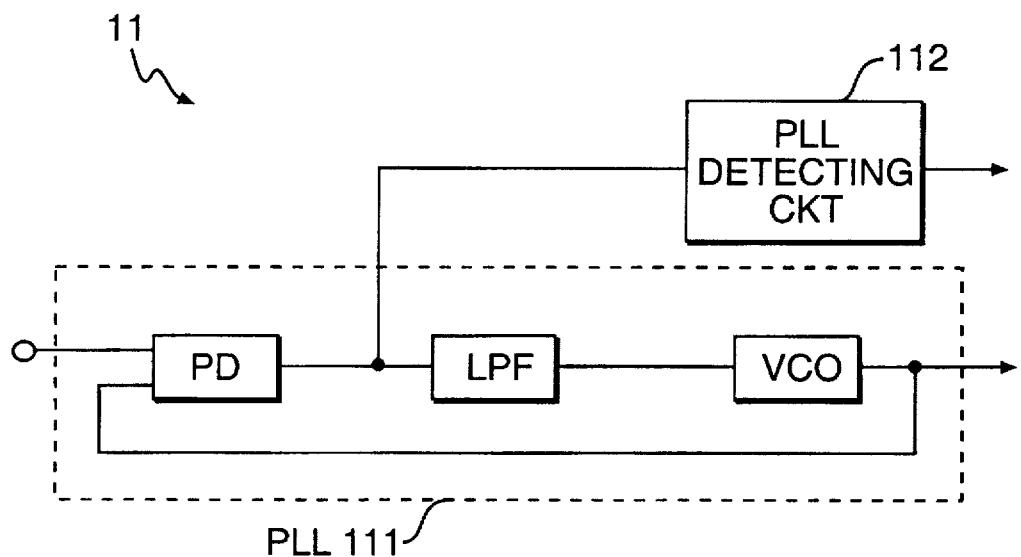

As shown in FIG. 3, the clock sampling circuit 10 includes a PLL circuit 101 which samples clock components contained in the read signal generated when the CD is rotated at the predetermined linear speed (1.3 m/s). It also includes a phase lock detecting circuit 102 for detecting whether the output of the phase comparator circuit, within the PLL circuit 101, is within a predetermined value. The sampled clock signal is then forwarded to a rotation control circuit 13 and the lock detection signal outputted from the phase lock detecting signal 102 is forwarded to the system control circuit 8. Similarly, the clock sampling circuit 11 comprises a PLL circuit 111 for sampling clock components contained in the read signal obtained when the DVD is rotated the predetermined linear speed (3.27 m/s). It also includes a phase lock detecting circuit 112 for the PLL circuit 111. The sampled clock signal is forwarded to a rotation control circuit 14 for the DVD and the lock detection signal outputted from the phase lock detecting circuit is forwarded to the system control circuit 8. It is noted that it is possible to incorporate the identifying system disclosed as the present embodiment into the combination unit such that the clock signal outputted from the clock sampling circuit 10 or 11 is supplied to a decoder circuit (not shown) for the CD or DVD discs.

The rotation control circuit 13 includes an oscillator for generating a reference clock signal containing frequency components corresponding to the linear speed of the CD and a phase comparator for detecting a phase difference between the clock signal sampled by the clock sampling circuit 10 and the reference clock signal. A signal corresponding to the detected phase difference is supplied to one of the three input terminals of the switch 12.

The rotation control circuit 14 includes an oscillator for generating a reference clock signal containing frequency components corresponding to the linear speed of the DVD and a phase comparator for detecting a phase difference between the clock signal sampled by the clock sampling circuit 11 and the reference clock signal. A signal corresponding to the detected phase difference is supplied to one of the three input terminals of the switch 12. The output signal from the rotation control circuit 6 is input to one of the remaining input terminals of the switch 12. Then, corresponding to a switching signal from the system control circuit 8, the switch 12 selects one of the input signals as a rotation control signal to supply to the spindle motor 3.

Figure 4:
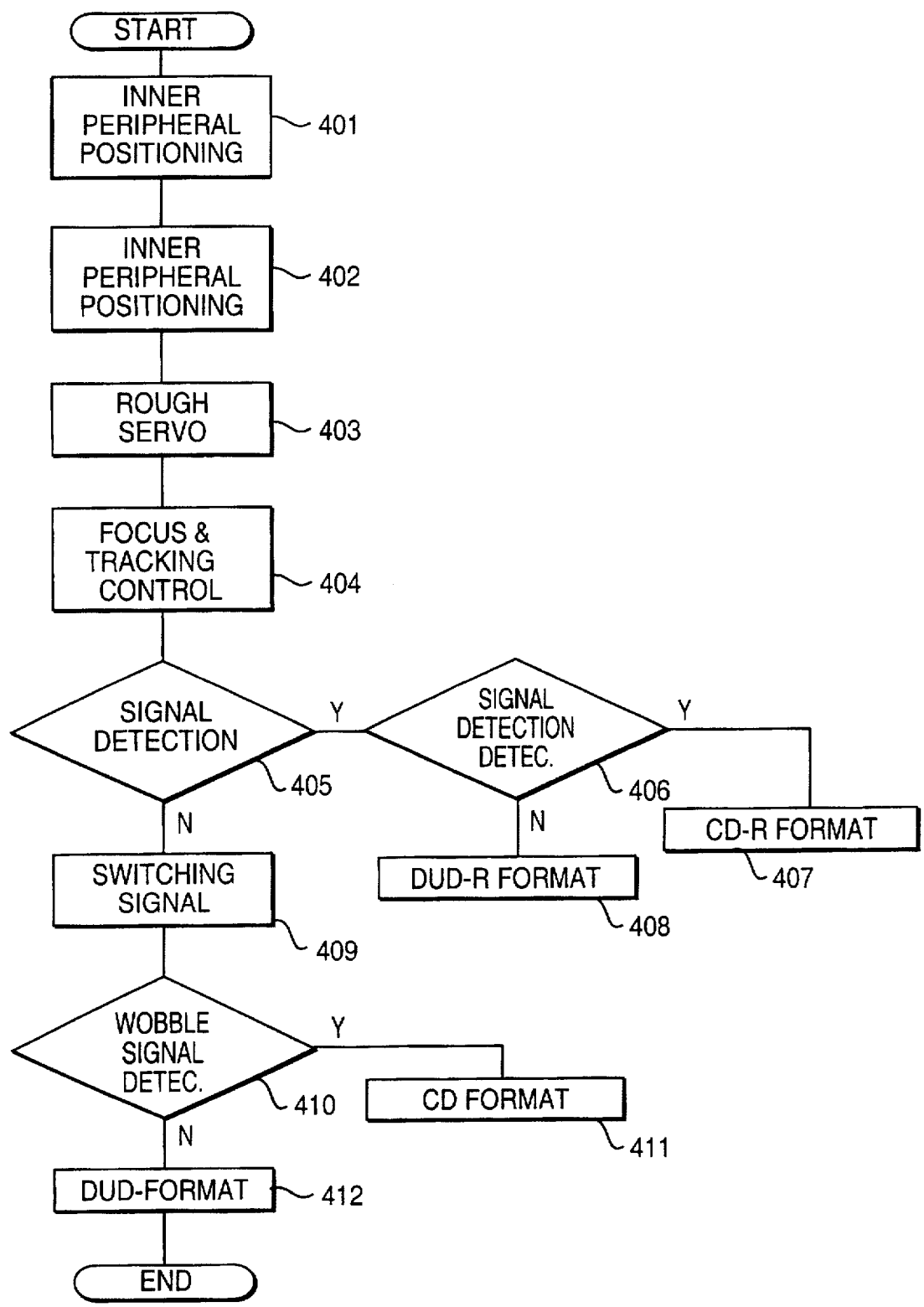
FIG. 4 is an operational flow chart of the disc type identifying operation of the first embodiment of the present invention.

The operation for distinguishing one disc type from the others is carried out by the system control circuit 8 in the structure described above will be explained below with reference to FIG. 4. It is assumed that the disc 1, has been mounted already on the disc mounting section of the identifying system in the explanation which follows.

When the disc 1, is mounted, the system control circuit 8 outputs a shift signal to the servo circuit 5 in order to shift the light pickup 2 in the direction of the inner periphery of the disc in Step 401. It stops shifting the light pickup 2 in Step 402 when it detects that the light pickup 2 has reached the predetermined inner peripheral position by a detection signal from a position detecting switch not shown. Next, it outputs a switching signal for connecting with the rotation control circuit 6 to switch 12 and causes the rotation control circuit 6 to set the rotational speed of the CD at the above-mentioned predetermined inner peripheral position and to execute a rough servo in Step 403. The system control circuit 8 lights up a laser diode within the light pickup 2 causing it to execute focus and tracking control via the servo circuit 5 in Step 404. In this state it determines, in Step 405, whether a detection signal is outputted from the comparator circuit 93 in the wobble signal detecting circuit 9, i.e. whether it is an H-level signal or not. If the detection signal is being outputted, i.e. The result is YES in Step 405, the system control circuit 8 shifts the process to Step 406 to determine whether a detection signal is outputted from the comparator circuit 94, i.e. whether it is an H-level signal or not. If the detection signal is outputted, i.e. The result is YES in Step 406, it indicates that a wobble signal is detected with a frequency of 22.05 KHz when the disc is rotated at the linear speed of the CD format, therefore, the system control circuit 8 determines that the disc 1 is of the CD-R format type in Step 407. If it is determined in Step 406 that no detection signal is outputted from the comparator circuit 94, thereby indicating that the wobble signal is detected with a frequency of 22.05 KHz when the disc is rotated at the linear speed of the CD format, the system control circuit 8 determines that the disc 1 is of the DVD-R format type in Step 408. When it is determined in Step 405 that no detection signal is outputted from the comparator circuit 93 on the other hand, the system control circuit 8 advances the process to Step 409 to forward a switching signal to the switch 12 in order to switch from the rough servo, by means of the rotation control circuit 6, to the precision servo in which the clock component of the read signal is phase-synchronized with the reference clock component by means of the rotation control circuit 13. At this time, the lock detection signal of the clock sampling circuit 10 is monitored to determine whether the lock detection signal is obtained within a predetermined period of time from the start of the switching in the switch 12 from the rotation control circuit 6 to the rotation control circuit 13. If the lock detection signal is obtained, i.e. The result is YES in Step 410, it indicates that no wobble signal is detected and the PLL circuit in the clock sampling circuit 10 is locked to the playback signal when the disc is rotated at the linear speed of the CD format, therefore, the system control circuit 8 determines that the disc 1 is of the CD format type in Step 411. When no lock detection signal is obtained, i.e. The result is NO in Step 410, it indicates that no wobble signal is obtained and the PLL circuit in the clock sampling circuit 10 cannot be locked to the playback signal when the disc is rotated at the linear speed of the CD format, therefore, the system control circuit 8 determines that the disc 1 is a disc type other than one of the CD, CD-R and DVD-R formats, i.e. The DVD format in Step 412.

It is noted that when the disc 1 is determined to be of the DVD-R or DVD formats in Step 408 or Step 412, the system control circuit 8 outputs a switching signal to the switch 12 to switch from the rotation control circuit 13 to the rotation control circuit 14 which rotates the disc at the linear speed of the DVD format.

It is thus possible to carry out the operation for distinguishes one disc type from the others during the startup operation in the combination unit by programming it so as to carry out the disc type identifying operation at the linear speed of the CD format, whose linear speed is slowest, and to switch the control of rotation to the high speed control when the disc type is determined to be that of the DVD format, so that the startup time can be shortened, thus enhancing the efficiency of the system.

[Second Embodiment]

Figure 5:
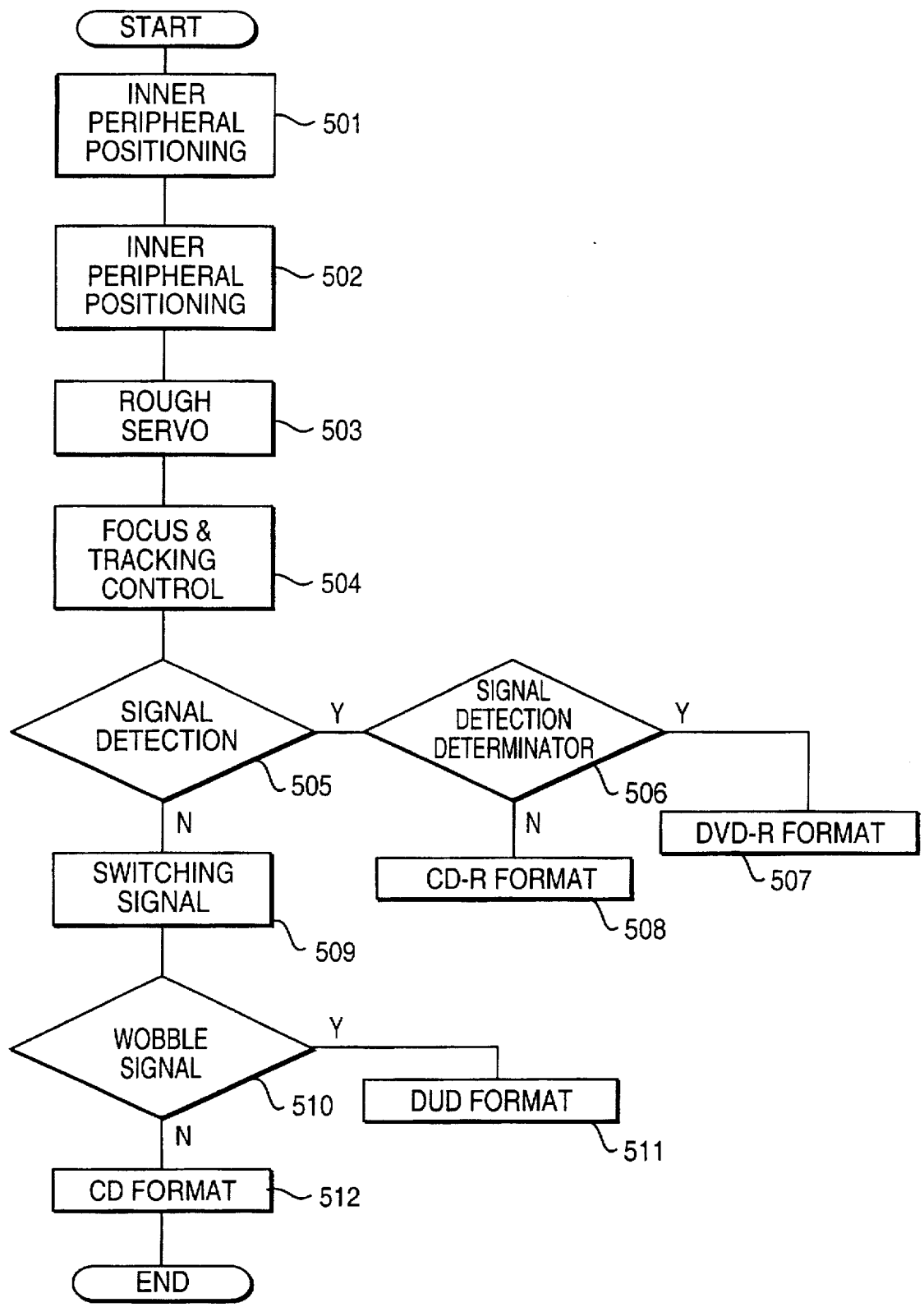
FIG. 5 is an operation flow chart of the disc type identifying operation according to a second embodiment of the present invention.

A second embodiment of the present invention will be explained below with reference to FIGS. 1 and 5.

While the case in which the disc type identifying operation is carried out at the linear speed of the CD format type disc, whose linear speed is slowest, has been described in the first embodiment, a disc type identifying system suitable for the combination unit in which the DVD format type disc is rotated at normal speed and the CD format type disc is rotated at a high speed such as quadruple its normal linear speed will be explained in the second embodiment. It is noted that the pre-format of the DVD-R format type disc is the same as that of the first embodiment.

The disc type identifying system of the second embodiment is different from that of the first embodiment in that the rotational speed which corresponds to the linear speed (about 3.27 m/s) of the DVD format type is preset by the system control circuit 8 and that the oscillation frequency of the reference clock signal in the rotation control circuit 13 is quadrupled to play back the CD at quadruple speed.

The disc type identifying operation carried out by the system control circuit 8 in the structure described above will be explained with reference to FIG. 5.

When disc 1 is mounted, the system control circuit 8 shifts the light pickup 2 to a predetermined inner peripheral position in Steps 501 and 502. It then outputs a switching signal connecting the rotation control circuit 6 to the switch 12, causing the rotation control circuit 6 to set the rotational speed of the DVD format type disc at the above-stated predetermined inner peripheral position and to execute a rough servo in Step 503. Next, the system control circuit 8 lights up the laser diode within the light pickup 2 causing it to execute focus and tracking control via the servo circuit 5 in Step 504. It then determines in Step 505 whether a detection signal is outputted from the comparator circuit 93 in the wobble signal detecting circuit 9, i.e. whether it is an H-level signal or not. If the detection signal is being outputted, i.e. The result is YES in Step 505, the system control circuit 8 shifts the process to Step 506 to determine whether a detection signal is being outputted from the comparator circuit 94, i.e. whether it is an H-level signal or not. If the detection signal is being output, i.e. The result is YES in Step 506, it indicates that a wobble signal is detected with a frequency 22.05 KHz when the disc is rotated at the linear speed of the DVD format, therefore, the system control circuit 8 determines that the disc 1 is of the DVD-R format type in Step 507. When it is determined in Step 506 that no detection signal is outputted from the comparator circuit 94, indicating the detection of the wobble signal and that its frequency is not 22.05 KHz when the disc is rotated at the linear speed of the DVD format, threfore, the system control circuit 8 determines that the disc 1 is of the CD-R format type in Step 508. If it is determined, in Step 505, that no detection signal is outputted from comparator circuit 93, the system control circuit 8 advances the process to Step 509, thereby supplying a switching signal to switch 12 switching from the rough servo via the rotation control circuit 6 to the precision servo, having the read signal clock component phase-synchronized with the reference clock component via the rotation control circuit 14. Thus, monitoring the lock detection signal of the clock sampling circuit 11 to determine whether the lock detection signal is acquired within a predetermined period of time from the start of the switching process of the switch 12 from the rotation control circuit 6 to the rotation control circuit 14. When the lock detection signal is obtained, i.e. The result is YES in Step 510, indicating that no wobble signal is detected and the PLL circuit in the clock sampling circuit 11 is locked to the playback signal when the disc is rotated at the linear speed of the DVD format, threfore, the system control circuit 8 determines that the disc 1 is of the DVD format type in Step 511. When no lock detection signal is obtained, i.e. the result is NO in Step 510, indicating that no wobble signal is detected and the PLL circuit in the clock sampling circuit 11 cannot be locked to the playback signal when the disc is rotated at the linear speed of the DVD format, therefore, the system control circuit 8 determines that the disc 1 is of the CD format type in Step 512.

It is noted that when the disc 1, is determined to be of the CD-R format type or CD format type in Step 508 or Step 512, the system control circuit 8 outputs a switching signal for switching from the rotation control circuit 14 to the rotation control circuit 13 to the switch 12 so as to rotate the disc at a speed of four times that of the linear speed of the CD format.

It is thus possible to employ similar means, to distinguish one disc type from the others during the startup operation in the combination unit case, as explained in the first embodiment, by arranging to execute the disc type identifying operation at the linear speed of the DVD format type when the CD format type disc is rotated at a speed higher than the rotational speed of the DVD format type disc and to switch the control of rotation to the high speed control when the disc type is determined to be that of the CD format, so that the startup time is shortened, thus enhancing the efficiency of the system.

[Third Embodiment]

Figure 8A:
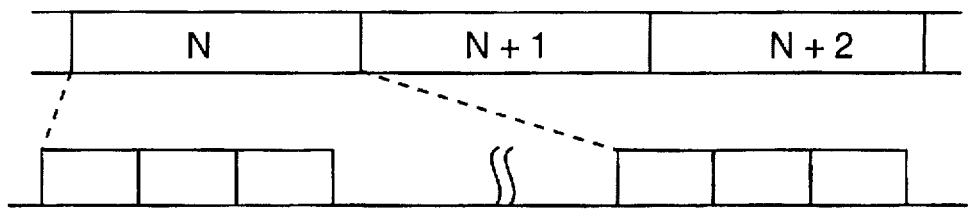
FIGS. 8a and 8b are a diagram and a perspective view depicting one example of the pre-information utilized in the third embodiment of the present invention.
Figure 8B:
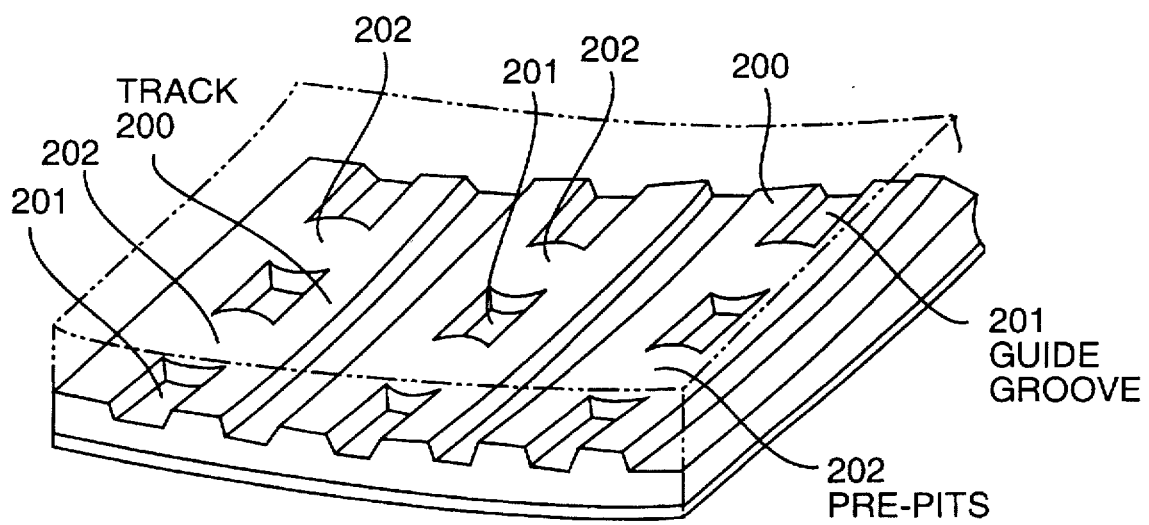

A third embodiment of the present invention will be explained below with reference to FIGS. 6 and 9. The third embodiment is applied to the case of identifying a rewritable disc type having a third recording format, in addition to the CD-R and DVD-R formats. It is assumed that pre-information has been recorded in advance as pre-pits on the DVD-R and a third rewritable disc. It is also assumed that the linear speed of a third rewritable disc type is faster than that of the DVD-R. Furthermore, it is assumed that pre-pits 202 carry pre-information composed of address data, sink marks, preamble signals and the like as shown in FIG. 8a and are recorded as a string of data having a predetermined bit length at the starting position of the data sectors provided on the disc at predetermined time intervals on guide groove 201 adjacent to a track 200 for recording information as shown in FIG. 8b.

Figure 6:
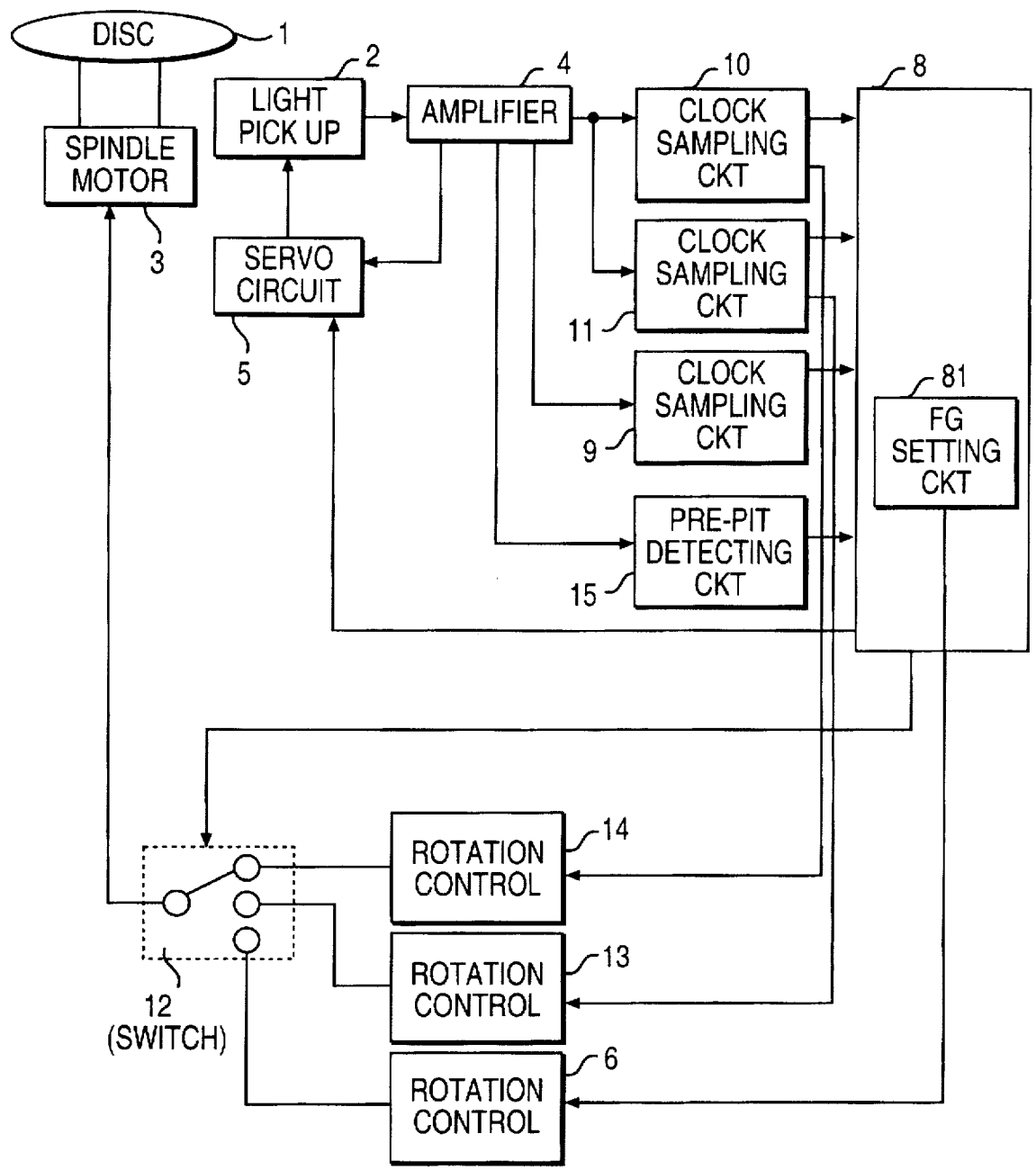
FIG. 6 is a block diagram depicting the circuit configuration of a disc type identifying system according to a third embodiment of the present invention.

FIG. 6 shows the whole structure of the disc type identifying system of the third embodiment. It is noted that in FIG. 6, the components in common with those of FIG. 1 are designated with the same reference numeral and an explanation thereof will be omitted here.

Figure 9A:
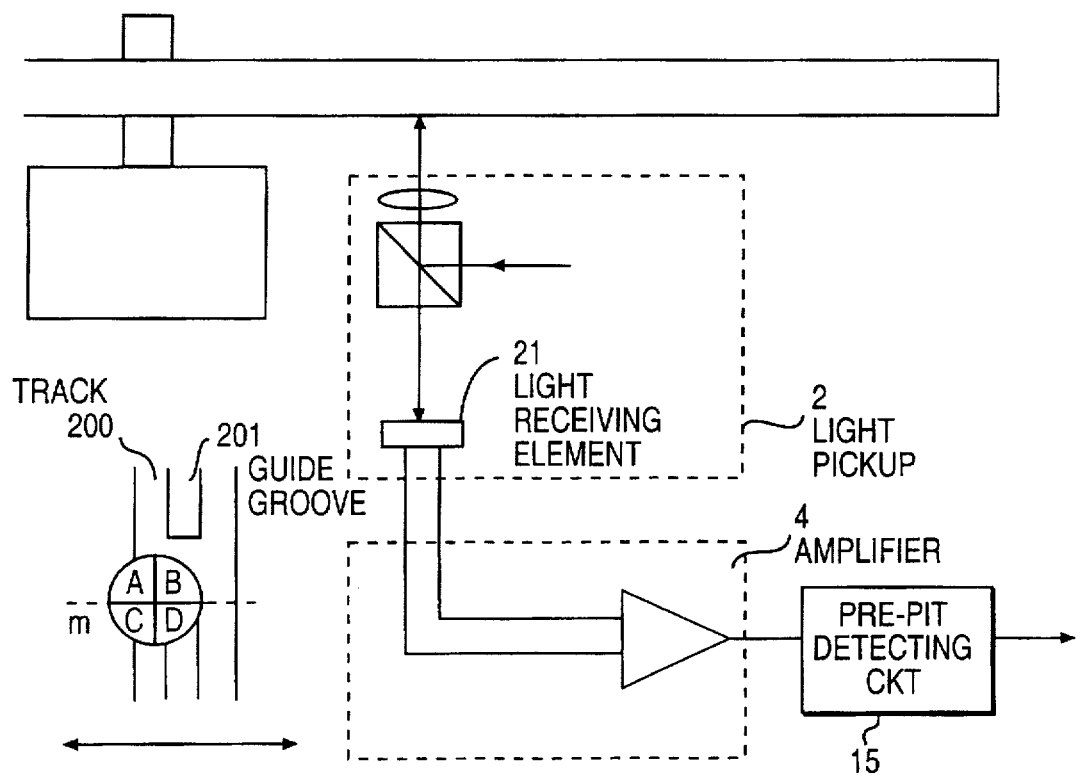
FIGS. 9a and 9b are block diagrams depicting a circuit configuration of a pre-pit detecting circuit of the third embodiment of the present invention.
Figure 9B:
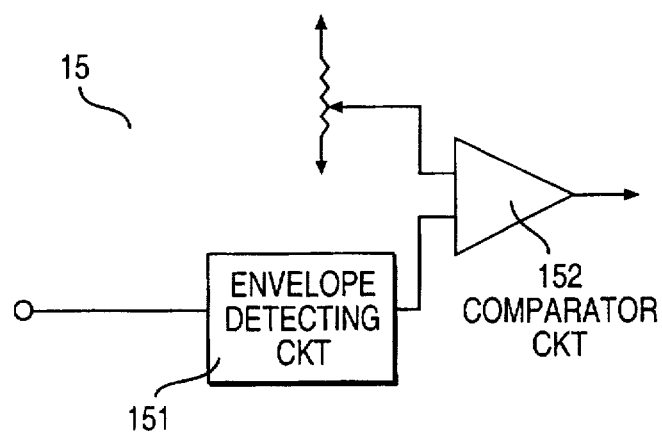

In FIG. 6, a pre-pit detecting circuit 15 is supplied with a tangential push-pull signal (TPP signal) which is a differential signal of the light receiving element 21 divided into two parts by a parting line "m" which is parallel to the direction of the radius of the disc via the head amplifier circuit 4 as shown in FIG. 9a. It is noted that a concrete principle for reading the pre-pits based on the TPP signal has been described in Japanese Patent Application No. Hei. 7-159645 which the present applicant has applied. The pre-pit detecting circuit 15 comprises an envelope detecting circuit 151 for detecting an envelope of the supplied TPP signal and a comparator circuit 152 for comparing the detected envelope with a predetermined value. Thus, because only the pre-pits exist on the disc at predetermined intervals when the disc 1 is of the non-recorded disc type, i.e., DVD-R, CD-R or any other rewritable type disc, the envelope of the TPP signal obtained when the disc 1 is rotated, emits a signal having a period of the existence of the pits and a predetermined amplitude. Then, a pulse signal which is generated when the pre-pits exist is obtained by comparing that signal with one half of the obtained amplitude value, for example, by the comparator circuit 152. The existence of the pre-pits are detected by detecting the existence of this pulse signal.

Figure 7:
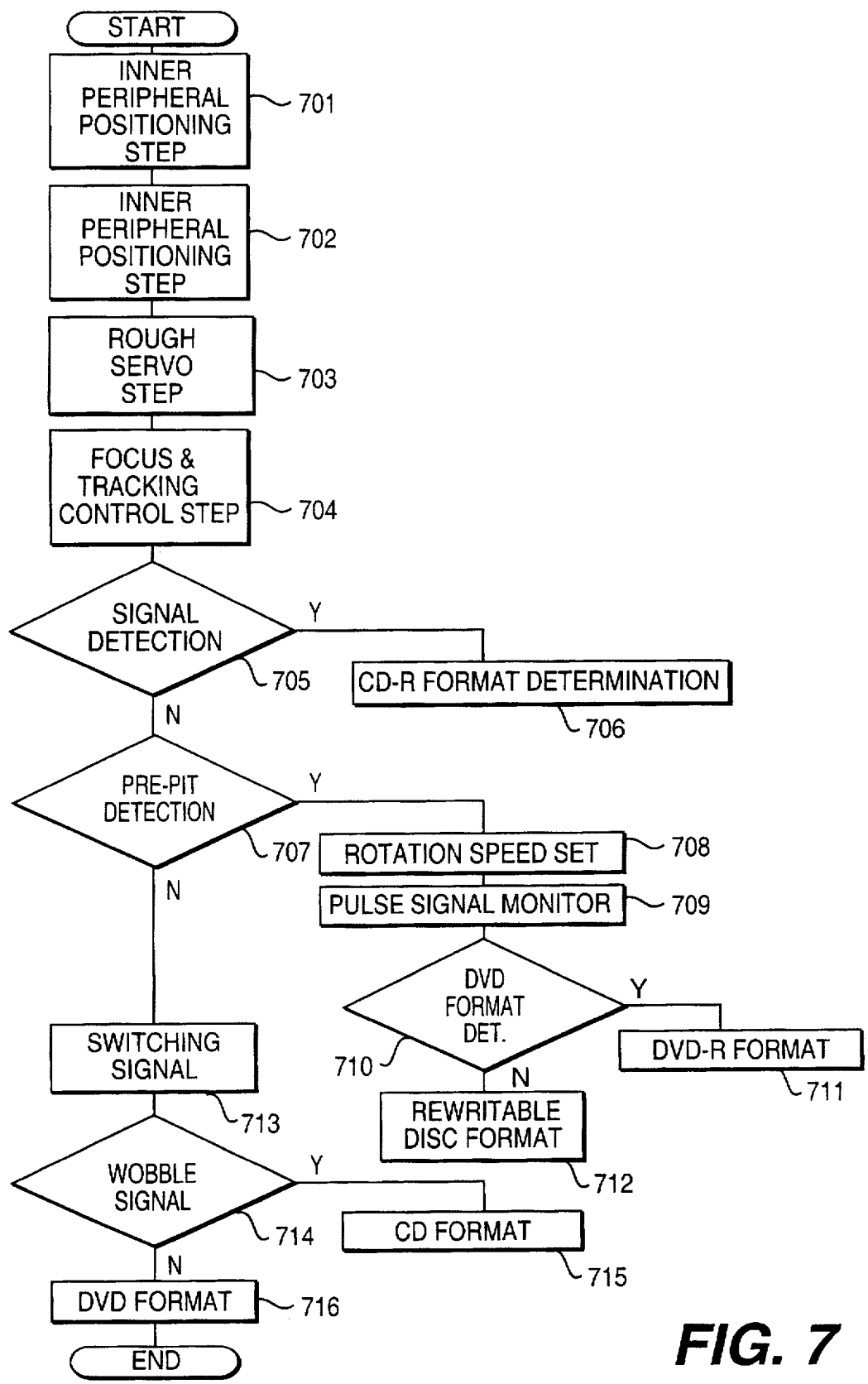
FIG. 7 is an operation flow chart of the disc type identifying operation of the third embodiment of the present invention.

The disc type identifying operation carried out by the system control circuit 8 in the structure described above will be explained with reference to FIG. 7.

When the disc 1 is mounted, the system control circuit 8 shifts the light pickup 2 to a predetermined inner peripheral position in Steps 701 and 702. It then outputs the switching signal for connecting with the rotation control circuit 6 to the switch 12 and causes the rotation control circuit 6 to set the rotational speed of the CD format type disc at the above-mentioned predetermined inner peripheral position causing it to execute the rough servo in Step 703. Then, the system control circuit 8 lights up the laser diode within the light pickup 2 to cause it to execute focus and tracking control via the servo circuit 5 in Step 704. Then, it determines in Step 705 whether the detection signal is being outputted from the comparator circuit 93 in the wobble signal detecting circuit 9, i.e. whether it is an H-level signal or not. If the detection signal is being outputted, i.e. the result is YES in Step 705, indicating that the wobble signal is detected when the disc is rotated at the linear speed of the CD format, the system control circuit 8 determines that the disc 1 is of the CD-R format type in Step 706. If it is determined that no detection signal is being outputted from the comparator circuit 93 in Step 705, the system control circuit 8 advances the process to Step 707 to determine whether a pre-pit detection signal is being outputted from the pre-pit detecting circuit 15. If the detection signal is outputted, i.e. the result is YES, in Step 707, the system control circuit 8 advances the process to Step 708 to change the speed set by the rotation control circuit 6 in order to change to the linear speed of the DVD format type disc. Next, shifting to the Step 709, the system control circuit 8 monitors the period of the pulse signal emitted from the pre-pit detecting circuit 15 to determine whether the period matches the period defined in the DVD format type in Step 710. If there is a match in periods, i.e. the result is YES in Step 710, the system control circuit 8 determines that it is of the DVD-R format type in Step 711. Upon determination in Step 710 that it is not the period defined in the DVD format, the system control circuit 8 determines that the disc 1 is a rewritable disc other than the CD-R and DVD-R disc formats type in Step 712. On the other hand, when it is determined that no detection signal is outputted, i.e. the result is NO, in Step 707 the system control circuit 8 advances the process to Step 713 to supply a switching signal to the switch 12 causing it to switch from the rough servo to the precision servo by means of the rotation control circuit 6 in which the clock component of the read signal is phase-synchronized with the reference clock component by means of the rotation control circuit 13. At this time, the lock detection signal of the clock sampling circuit 10 is monitored to determine whether the lock detection signal is acquired within the predetermined period of time from the start of the switching in the switch 12 from the rotation control circuit 6 to the rotation control circuit 13. When the lock detection signal is obtained, i.e., the result is YES in Step 714, indicating that no wobble signal is detected and the PLL circuit in the clock sampling circuit 10 is locked to the playback signal when the disc is rotated at the linear speed of the CD format, the system control circuit 8 advances the process to Step 715 to determine that the disc 1 is of the CD format. When no lock detection signal is obtained, i.e. the result is NO in Step 714, indicating no wobble signal nor pre-pit signal is detected and the PLL circuit in the clock sampling circuit 10 cannot be locked to the playback signal when the disc is rotated at the linear speed of the CD format, the system control circuit 8 determines that the disc 1 is of the DVD format type in Step 716.

As described above, the disc type may be identified from the others even when the pre-information of the rewritable disc type is recorded in the pre-pit form by detecting the frequency (period) of the playback signal obtained from the disc to be identified.

As described above, according to the present invention, it becomes possible to distinguish different types of discs correctly by arrangement so as to detect the frequency of the playback signal from the disc obtained in rotating the disc a predetermined number of rotations and to identify the disc type based on the frequency of the detected playback signal. Furthermore, it becomes possible to identify the disc type during the startup operation in the combination unit by presetting the predetermined number of rotations at the lowest linear speed, among linear speeds defined per each different type of disc, and also operates more efficiently.

While preferred embodiments have been described, it will be apparent to those skilled in the art that various modifications and variations can be made in the disc type identifying system of the present invention without departing from the spirit or scope of the invention. Thus, it is intended that the present invention cover the modifications and variations of this invention provided they come within the scope of the appended claims and their equivalents.

What is claimed is:

1. A disc type identifying system for identifying one optical disc format type from a plurality of optical disc format types having different recording formats, though having the same size and shape, comprising:

driving means for rotating a disc to be identified a predetermined number of rotations, wherein the predetermined number of rotations corresponds to the lowest linear speed among linear speeds utilized by the different recording formats;

frequency detecting means for detecting a frequency of a playback signal from the disc to be identified; and identifying means for identifying the disc format type from the plurality of optical disc format types based on the frequency of the playback signal detected when the disc, whose format is to be identified, is rotated the predetermined number of rotations.

2. An apparatus for identifying a format type of an optical disc from the rotating optical disc playback signal generated from a light pickup, comprising:

a frequency detecting circuit for detecting the frequency of the playback signal;

an identifying circuit for identifying the format type for the optical disc in accordance with the frequency detected by the frequency detecting circuit; and a driving means for rotating a disc a predetermined number of rotations, wherein the predetermined number of rotations corresponds to the lowest linear speed among the linear speeds utilized by the different recording formats.

3. The apparatus according to claim 2, wherein the frequency detecting circuit is a wobble signal detecting circuit.

4. The apparatus according to claim 3, wherein the wobble signal detecting circuit is comprised of;

a band pass filter;

a peakhold circuit; and at least one comparator circuit.

5. A method for identifying a format type of an optical disc, comprising the steps of:

detecting a frequency of a playback signal;

identifying the format type of an optical disc from the detected frequency of the playback signal; and driving the disc a predetermined number of rotations, wherein the predetermined number of rotations corresponds to the lowest linear speed among the linear speeds utilized by the different format types.

6. The method according to claim 5, wherein the step of detecting a frequency of a playback signal is executed by a wobble signal detecting circuit.

7. An optical disc player/recorder, comprising:

a motor;

a light pickup;

means for generating a playback signal from the light pickup;

a frequency detecting circuit receiving the playback signal;

an identifying circuit for identifying a format type of optical disc in accordance with the frequency detected by the frequency detecting circuit; and a driving means for rotating the disc a predetermined number of rotations, wherein the predetermined number of rotations corresponds to the lowest linear speed among the linear speeds utilized by the different format types.

8. The apparatus according to claim 7, wherein the frequency detecting circuit is a wobble signal detecting circuit.

9. The apparatus according to claim 8, wherein the wobble signal detecting circuit is comprised of;

a band pass filter;

a peakhold circuit; and at least one comparator circuit.

10. The apparatus according to claim 7, further comprising:

a switching circuit; and at least one rotation control circuit;

wherein the switching circuit switches to the respective rotation control circuit that corresponds to the optical disc format type identified by the identifying circuit.

11. The apparatus according to claim 10, wherein the frequency detecting circuit is a wobble signal detecting circuit.

12. The apparatus according to claim 11, wherein the wobble signal detecting is comprised of;

a band pass filter;

a peakhold circuit; and at least one comparator circuit.

* * * * *